US008686286B2

(12) United States Patent
Sekino et al.

(10) Patent No.: US 8,686,286 B2
(45) Date of Patent: Apr. 1, 2014

(54) ELECTRICAL WIRE ROUTING DEVICE

(75) Inventors: Tsukasa Sekino, Kosai (JP); Tomoyasu Terada, Kosai (JP); Shinji Kato, Kosai (JP)

(73) Assignee: Yazaki Corporation, Tokyo (JP)

( * ) Notice: Subject to any disclaimer, the term of this patent is extended or adjusted under 35 U.S.C. 154(b) by 278 days.

(21) Appl. No.: 13/201,418

(22) PCT Filed: Nov. 26, 2009

(86) PCT No.: PCT/JP2009/069968
§ 371 (c)(1),
(2), (4) Date: Aug. 12, 2011

(87) PCT Pub. No.: WO2010/095326
PCT Pub. Date: Aug. 26, 2010

(65) Prior Publication Data
US 2012/0024561 A1  Feb. 2, 2012

(30) Foreign Application Priority Data

Feb. 17, 2009  (JP) .................................. 2009-034358

(51) Int. Cl.
*H05K 5/02* (2006.01)
(52) U.S. Cl.
USPC .......................................................... 174/50
(58) Field of Classification Search
CPC ....................................................... H05K 5/02
USPC .................................................. 174/50, 500
See application file for complete search history.

(56) References Cited

U.S. PATENT DOCUMENTS 7,552,962 B2 *  6/2009  Habering et al. ............. 296/155

7,829,789 B2 * 11/2010 Yamaguchi .................. 174/72 A
2005/0264033 A1 * 12/2005 Aoki et al. .................... 296/155
2006/0199416 A1    9/2006 Tsubaki
2011/0290522 A1 * 12/2011 Sekino et al. ............... 174/68.3

FOREIGN PATENT DOCUMENTS

| JP | 11-263174 A | 9/1999 |
|----|-------------|--------|
| JP | 2006-35961 | 2/2006 |
| JP | 2007-143238 A | 6/2007 |
| JP | 2007-529354 A | 10/2007 |

OTHER PUBLICATIONS

PCT/ISA/210, International Search Report for corresponding PCT/JP2009/069968 (dated Jan. 19, 2010).
The extended European search report dated Aug. 20, 2013 for corresponding European Application No. 09840429.6.

* cited by examiner

*Primary Examiner* — Timothy Thompson
*Assistant Examiner* — Charles Pizzuto
(74) *Attorney, Agent, or Firm* — Edwards Wildman Palmer LLP

(57) ABSTRACT

An electrical wire routing device for routing an electric wire between a floor in an automobile and a seat includes a case following parallel to a support rail to which a support body supporting the seat is slidably attached. The case includes a tubular movement section attaching the electric wire thereto, guiding the electric wire to the seat, to which a slider sliding in association with the movement of the seat is slidably attached, and a housing section accommodating the extra length of the electric wire. The movement section and the housing section are provided as separated parts and placed parallel to each other. The extra length of the electric wire extracted from one end portion of the movement section and drawn into the housing section is accommodated in the housing section with the electric wire bent in a U-shape. The electric wire is accommodated in the corrugated tube.

9 Claims, 8 Drawing Sheets

ELECTRICAL WIRE ROUTING DEVICE

TECHNICAL FIELD

This invention relates to an electrical wire routing device routing across between, e.g., a car body such as a car floor and a slide body such as a seat slidably attached to the car body.

BACKGROUND ART

An automobile may be provided with a seat as a slide body slidable with respect to such as a floor of a passenger compartment as a car body. An electric device, such as a seat sensor detecting whether a passenger seats or not, is attached to the seat. For the automobile having the slidable seat, various electrical wire routing device routing an electric wire across between the floor and the seat for connecting electric devices attached to the seat with electric devices fixed to the floor has been employed (e.g., see Patent Document 1).

The above electrical wire routing device 201 described in Patent Document 1, as shown in FIGS. 7 and 8, can wire a electric wire 250 across between a floor of a passenger compartment as a car body and a seat 203 slidably provided as a slide body with the floor along the arrow K2. The electrical wire routing device 201 includes a case 205 following parallel to a support rail 220 to which a support body 221 supporting a seat 203 is slidably attached, a rail 211 disposed in the case 205, a slider 206 sliding on the rail 211 interlocking with the seat 203, a corrugated tube 204 accommodating a electric wire 250, a protector 230, and a pair of malls 207a and 207b. The support rail 220 is located under a mat of the passenger compartment.

The case 205 is formed in the tubular shape with a lower case 209 and an upper case 210 made from thick metal plate stacked each other. The case 205 is located under the mat of the passenger compartment. The case 205 is provided with a regulation portion 212 made by the bottom wall of the lower case 209 being punched out convexly toward the upper case 210. The regulation portion 212 separates a space in the case 205 into a first space 205a a rail 211 is attached to and a second space 205b away from the rail 211 so as to regulate in a U-shape a routing root of the corrugated tube 204, i.e., electric wire 250 in the case 205a. In the first space 205a, a slider 206 supporting one end of the corrugated tube 204 slides on a rail 211 along the arrow K2. The corrugated tube 204, i.e., the extra length of the electric wire 250 is accommodated in the second space 205b with the extra length thereof straightly stretched. The electrical wire routing device 201 thus prevents one end portion and the other end portion of the corrugated tube 204 moving in the case 205 from rubbing each other by the regulation portion 212, which allows the corrugated tube 204 to move smoothly.

Further, there is provided in the case 205 a slit 225 extending along the arrow K2 for guiding the upside of the slider 206 out of the case 205 from within the case 205. The upside of the slider 206 extracted from the slit 225 to out of the case 205 projects toward the passenger compartment through a cut located on the mat, guiding the electric wire 250 extracted from the one end of the corrugated tube 204 to the seat 203 arranged in the passenger compartment 203 side.

Further, because the case 205 happens to be stomped by the passenger in the automobile, the case 205 is made thicker or a recess 243 and projection 242 are arranged alternately along the arrow K2 on the ceiling wall of the upper case 210 and so on to prevent deformation or breakage of the case 205 when stomped, leading to improve stiffness thereof.

The protector 230 is connected to the slider 206 by a string, and has a flange attached to the seat 203 and an electric wire support portion supporting the electric wire 250 wired within the seat 203 through the slider 206.

The pair of malls 207a and 207b is attached to the case 205 and prevents foreign particles from intruding into the case 205 from the slit 225. Note that the symbol 208 in FIG. 8 is a bracket for attaching the other mall 207a.

PRIOR ART DOCUMENT

Patent Document

Patent Document 1: JP, A, 2006-35961

Disclosure of the Invention

Problem to be Solved by the Invention

However, a structure of the conventional electrical wire routing device 201 in which the corrugated tube 204, i.e., the extra length of the electric wire 250 is accommodated in the second space 205b with the extra length thereof straightly stretched has caused the second space 205b to become long along the sliding direction of the seat 203, i.e., the longitudinal direction of the case 205, resulting in growing in size of the case 205 as a problem.

Further, the conventional electrical wire routing device has been required to adopt the regulation portion 212 or the recess 243 and the projecting 242 for stiffness improvement, resulting in complicate structure of the case 205 as a problem. In addition, attaching other parts instead of forming the regulation portion 212 by punching out the lower case 209 causes increasing the number of parts as a problem.

Accordingly, an object of the present invention is to provide a compact electrical wire routing device.

Means for Solving the Problem

For attaining the object, according to the invention described in claim 1, there is provided an electrical wire routing device for routing an electric wire across between a car body and a slide body disposed slidably with respect to the car body, comprising: a case including a movement section to which a slider is slidably attached along a sliding direction of the slide body, and a housing section accommodating the extra length of the electric wire and fixed to the car body, the slider to which the electric wire is attached guiding the electric wire into the slide body, wherein the movement section and the housing section are placed in the direction perpendicular to the sliding direction; and a partition wall separating the movement section and the housing section being disposed between the movement section and the housing section along the whole length of the case; wherein the extra length of the electric wire extracted from one end portion of the movement section and drawn from one end portion of the housing section positioned near the one end portion of the movement section into the housing section is accommodated in the housing section while being bent in a U-shape.

According to the invention described in claim 2, there is provided the electrical wire routing device as claimed in claim 1, further comprising: a tube made of elastic, deformable material and accommodating the electric wire; and a guide member provided with a guide section, the guide section bending the tube in a U-shape extracted from the one of the movement section so as to guide the tube into the one end of the housing section, and guiding the tube such that the tube abuts the inner circumference surface of the housing section away from the movement section; wherein the tube is bent in a U-shape in the housing section, and wherein the portion bent abuts the inner circumference surface of the housing section near the movement section by a force of elastic restitution of the tube.

According to the invention described in claim 3, the electrical wire routing device as claimed in claim 2, further comprising a derivation section disposed in the guide member, the derivation section crossing the electric wire extracted from the tube bent in the housing section and the guide section at vertically different height and extracting the electric wire to the outside of the housing section.

According to the invention described in claim 4, there is provided the electrical wire routing device as claimed in any one of claims 1 to 3, wherein the movement section and the housing section is provided separately, and wherein each of the movement section and housing section includes a side wall as the partition wall, respectively.

According to the invention described in claim 5, there is provided the electrical wire routing device as claimed in claim 4, wherein each of the movement section and the housing section is formed in the uniform shape in cross section along the slide direction, respectively.

Effects of the Invention

According to the invention described in claim 1, since an electrical wire routing device for routing an electric wire across between a car body and a slide body disposed slidably with respect to the car body, comprises: a case including a movement section to which a slider is slidably attached along a sliding direction of the slide body, and a housing section accommodating the extra length of the electric wire and fixed to the car body, the slider to which the electric wire is attached to guides the electric wire into the slide body, wherein the movement section and the housing section are placed in the direction perpendicular to the sliding direction; and a partition wall separating the movement section and the housing section being disposed between the movement section and the housing section along the whole length of the case; wherein the extra length of the electric wire extracted from one end portion of the movement section and drawn from one end portion of the housing section positioned near the one end portion of the movement section into the housing section is accommodated in the housing section while being bent in a U-shape, the length from the one end to the other end of the housing section will be formed smaller than when the extra length is accommodated with the extra length straightly stretched, and a compact electrical wire routing device will therefore be provided.

According to the invention described in claim 2, since the electrical wire routing device as claimed in claim 1, further comprises: a tube made of elastic, deformable material and accommodating the electric wire; and a guide member provided with a guide section, the guide section bending the tube in a U-shape extracted from the one of the movement section so as to guide the tube into the one end of the housing section, and guiding the tube such that the tube abuts the inner circumference surface of the housing section away from the movement section; wherein the tube is bent in a U-shape in the housing section, and wherein the portion bent abuts the inner circumference surface of the housing section near the movement section by a force of elastic restitution of the tube, the tubes do not rub each other and move smoothly when the tubes moves in and out the housing section even if the regulation portion which would have been provided heretofore or a guide member such as a pulley is not provided in the housing section, which allows a more compact electrical wire routing device to be provided.

According to the invention described in claim 3, since the electrical wire routing device as claimed in claim 2, further comprising a derivation section disposed in the guide member, the derivation section crossing the electric wire extracted from the tube bent in the housing section and the guide section at vertically different height and extracting the electric wire to the outside of the housing section, rubbing of portions where these tubes and electric wires cross to each other when the tube moves in and out the housing section can be prevented.

According to the invention described in claim 4, since the electrical wire routing device wherein the movement section and the housing section is provided separately, and wherein each of the movement section and housing section includes a side wall as the partition wall, stiffness of the housing section is improved and the recess or the projection is not required to be disposed in the movement section and the housing section, which would have been disposed for improving stiffness heretofore, which allows the shape of these movement section and housing section to be simplified.

According to the invention described in claim 5, since there is provided the electrical wire routing device wherein each of the movement section and the housing section is formed in the uniform shape in cross section along the slide direction, these movement section and the housing section can be formed by extrusion molding or roll molding at low processing cost.

BRIEF DESCRIPTION OF DRAWINGS

FIGS. 6A and 6B views for explaining an operation of the electrical wire routing device shown in FIG. 1, wherein FIG. 6A is a view showing a state of the slider being positioned at one end of a movement section, and FIG. 6B is a view showing a state of the slider being positioned at the other end of movement section.

DESCRIPTION OF EMBODIMENTS

Hereinafter, an electrical wire routing device according to one embodiment of the present invention will be explained with reference to FIGS. 1 to 6.

Figure 1:
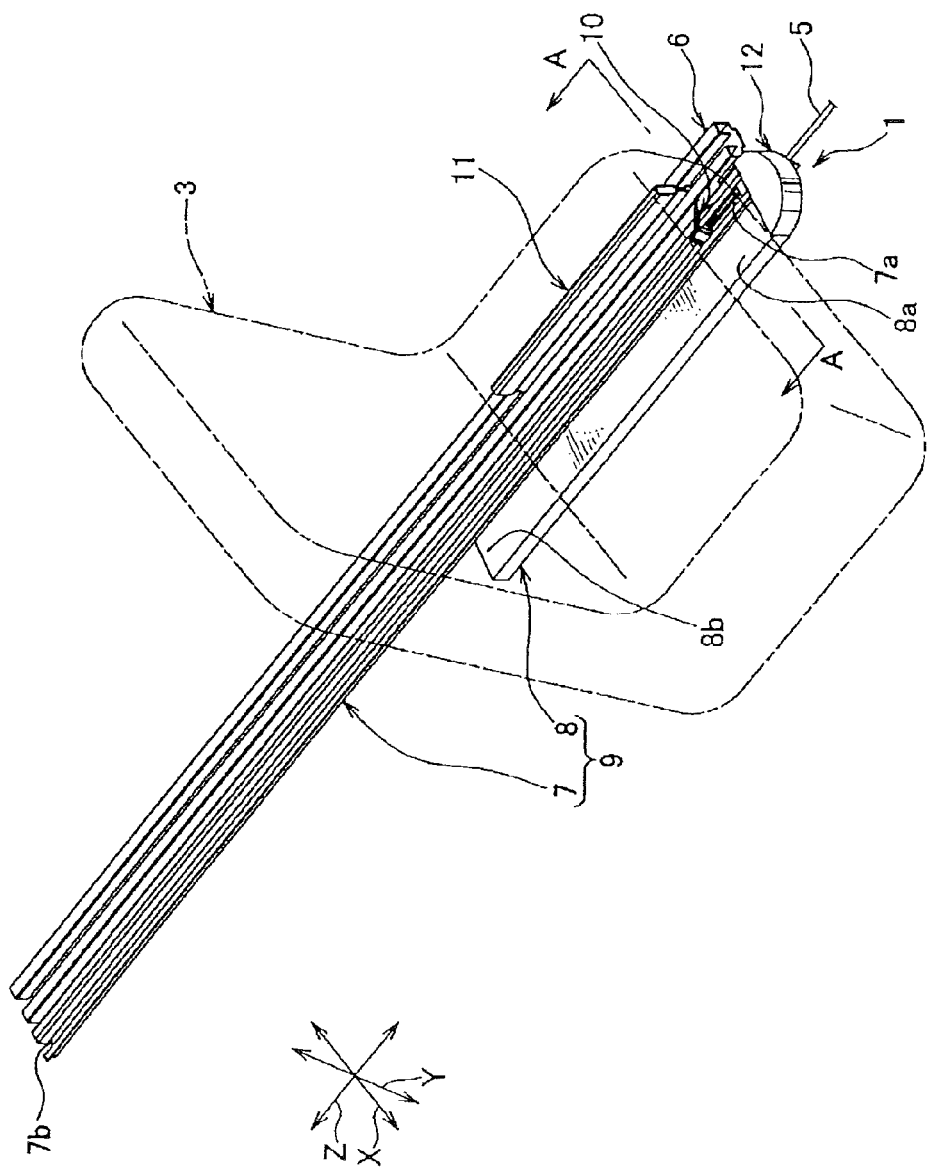
FIG. 1 A perspective view showing an electrical wire routing device according to one embodiment of the present invention.
Figure 4:
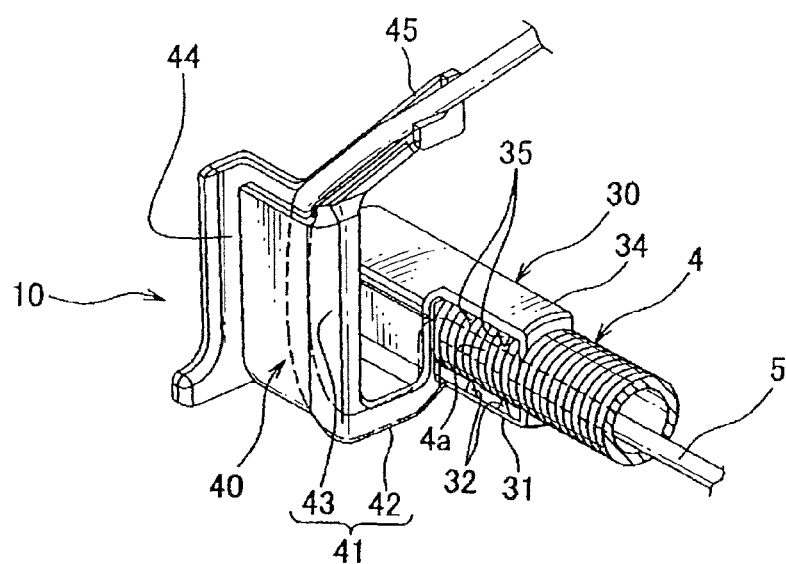
FIG. 4 A perspective view showing a slider configuring the electrical wire routing device shown in FIG. 1.
Figure 5:
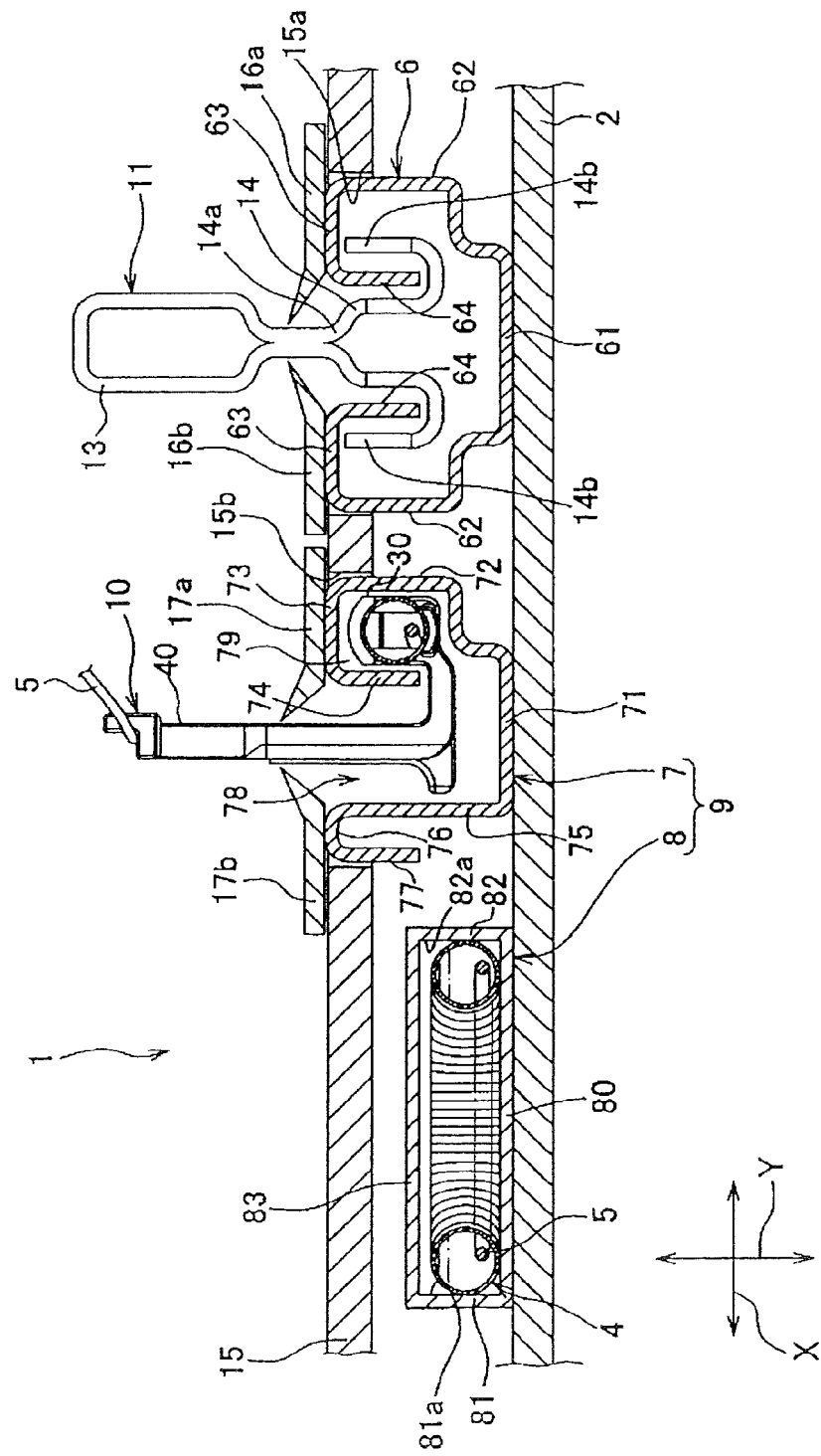
FIG. 5 A sectional view along the A-A line in FIG. 1.

An electrical wire routing device 1, as shown in FIGS. 1 and 5, is an apparatus routing an electric wire from a floor 2 of a passenger compartment as a car body of an automobile to a seat 3 as a slide body slidably disposed in the floor 2 along the arrow Z. A mat 15 is laid on the floor 2 (see FIG. 5). The arrow Z in FIGS. 1 to 6 is parallel to the fore and aft direction of the automobile. The arrow X is parallel to the cross direction of the automobile. The arrow Y is parallel to the vertical direction of the automobile.

To the seat 3 are attached electric devices such as a seat sensor detecting whether or not a passenger seats or a seat belt sensor detecting whether or not a passenger seating on the seat 3 uses a seat belt.

The electric wire 5 is a well-known covered electric wire, and connects the electric devices attached to the seat 3 to an ECU (Electronic Control Unit) attached to the floor 2, i.e., a car body.

The electrical wire routing device 1 includes: a case 9 fixed to the floor 2 and arranged under the mat 15, a corrugated tube 4 as a tube accommodating a electric wire 5, a slider 10 to which one end 4a of the corrugated tube 4, i.e., the wire 5 is attached guiding the electric wire 5 extracted from the one end 4a into the seat 3 and sliding in a case 9 in association with the movement of the seat 3, a guide member 12 attached to the case 9, a pair of malls 17a and a 7b (shown in only FIG. 5, omitted in the other Figs.)

The case 9, as shown in FIG. 1, follows parallel to a support rail 6 to which a support body 11 supporting the seat 3 is slidably attached, and includes a movement section 7 to which a slider 10 is slidably attached in the sliding direction, a housing section 8 tubularly extending along the longitudinal direction of the movement section 7 (the arrow Z direction), following parallel to the movement section 7, and accommodating the corrugated tube 4, i.e. the extra length of the electric wire 5 extracted from one end 7a of the movement section 7 with the extra length bent in a U-shape. Namely, the support rail 6, the movement section 7 and the housing section 8 are arranged sequentially in the direction perpendicular to the seat 3 sliding. The move 7 and the housing section 8 are disposed separately.

The support body 11, shown in FIG. 5, includes a seat attachment portion 13 attached to the seat 3, and a sliding portion 14 sliding in the support rail 6 positioned within the support rail 6.

The support rail 6 is formed by a metal plate being folded back and the like, and includes a bottom wall 61 stacked on the floor 2, a pair of side walls standing from each of the both ends of the bottom wall 61 in the width direction (the arrow X direction), a pair of upper walls 63 extending from the upper end of the each side wall 62 to the direction of approaching each other and opposite to the bottom wall 61, and a pair of inner walls 64 extending from an end away from the side walls 62 of the each upper wall 63 toward the bottom wall 61 side. The pair of inner walls 64 are spaced each other and spaced from the bottom wall 61. A slit open to the seat 3 is thus formed between the pair of the inner walls 64. The support rail 6 is formed in the rail shape, i.e., the tubular shape such that the cross section thereof is equal from one end to the other end in the longitudinal direction (the arrow Z direction) as shown in FIG. 1. Each of a mall 16a, 16b (shown in FIG. 5) is attached to the outer circumference of the pair of the upper walls 63. The pair of the malls 16a, 16b covers the slit to prevent foreign particles such as grit and dust from intruding from the slit into the support rail 6.

Further, the sliding portion 14 of the support body 11 includes a middle portion 14a positioned between the pair of inner walls 64, i.e., the slit, a pair of extensions 14b communicating with the middle portion 14a and extending in the direction of separating each other (the arrow X direction). The pair of extensions 14b is each positioned in a pair of spaces away from each other surrounded by the bottom wall 61, the side wall 62, upper wall 63, and inner wall 64 of the support rail 6. Further, the seat attachment portion 13 is arranged above the middle portion 14a, i.e., the outside of the rail 6 and projects toward the passenger compartment from a cut 15a disposed in the mat 15 (shown in only FIG. 5).

In the embodiment the movement section 7 is formed by a metal plate being folded back and the like and includes, as shown in FIG. 5, a bottom wall 71 stacked on the floor 2, a side wall 72 standing from the end near the support rail 6 in the width direction (the arrow X direction) of the bottom wall 71, an upper wall 73 extending from the upper end of the side wall 72 toward the housing section 8 side, an inner wall 74 extending from an end away from the side wall 72 of the upper wall 73 toward the bottom wall 71 side, a side wall 75 extending from an end near the housing section 8 in the width direction of the bottom wall 71, an upper wall 76 extending from an upper end of the side wall 75 toward the housing section 8 side, and a outer wall 77 extending from an end away from the side wall 75 of the upper wall 76 toward bottom wall 71 side. Further, the inner wall 74 and the side wall 75 are spaced each other. The inner wall 74 is spaced from the bottom wall 71. A slit 78 open to the seat 3 is formed between the inner wall 74 and the side wall 75. The movement section 7, as shown in FIG. 1, is formed in the rail shape, i.e., the tubular shape such that cross section thereof is equal from one end 7a to the end 7b in the longitudinal direction.

In the embodiment the housing section 8 is made of metal, as shown in FIG. 5, includes a bottom wall 80 stacked on the floor 2, a upper wall 83 opposite to the bottom wall 80, a side wall 82 connecting an end of the bottom wall 80 near the movement section 7 with an end of the upper wall 83 near the movement section 7, and a side wall 81 connecting an end of the bottom wall 80 away from the movement section 7 with an end of the upper wall 83 away from the movement section 7, and is formed in the square tubular shape such that cross section thereof is equal from one end 8a to the other end 8b in the longitudinal direction (the arrow Z direction). The housing section 8 is arranged in the direction parallel to the movement section 7. The one end 8a in the longitudinal direction of the housing section 8 adjoins to one end 7a of the movement section 7. The extra length of the corrugated tube 4 extracted from the one end 7a of the movement section 7 is drawn into the housing section 8 from the one end 8a.

The side wall 75 of the movement section 7 and the side wall 82 of the housing section 8 mentioned above correspond to "the partition wall" recited in claims.

In the present invention, since the extra length of the corrugated tube 4 is accommodated in the housing section 8 with the extra length bent in a U-shape, the length of the housing section 8 can be arranged smaller than when the extra length is accommodated with the extra length straightly stretched. Namely, the electrical wire routing device can be formed compact.

Figure 7:
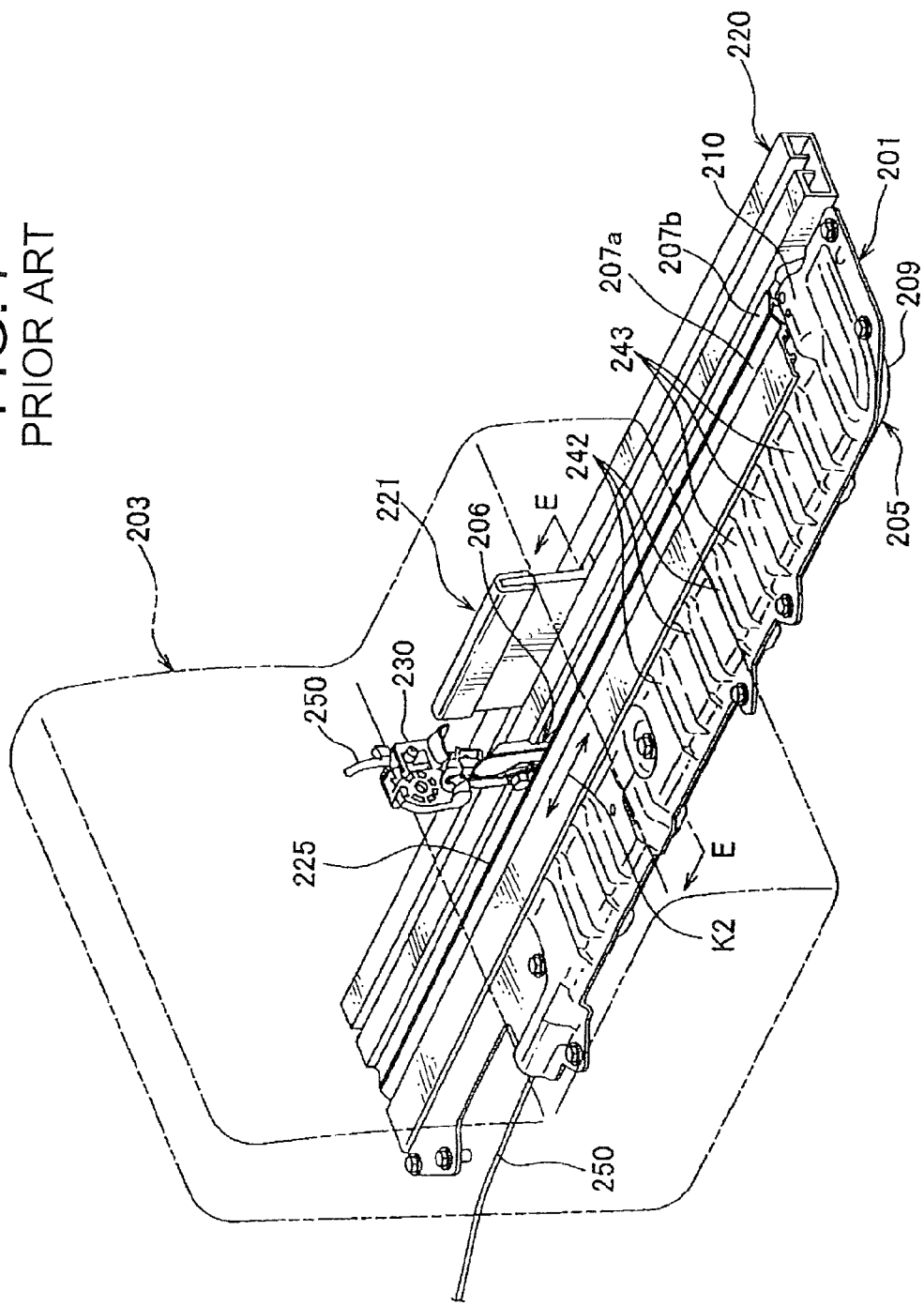
FIG. 7 A perspective view showing a conventional electrical wire routing device.
Figure 8:
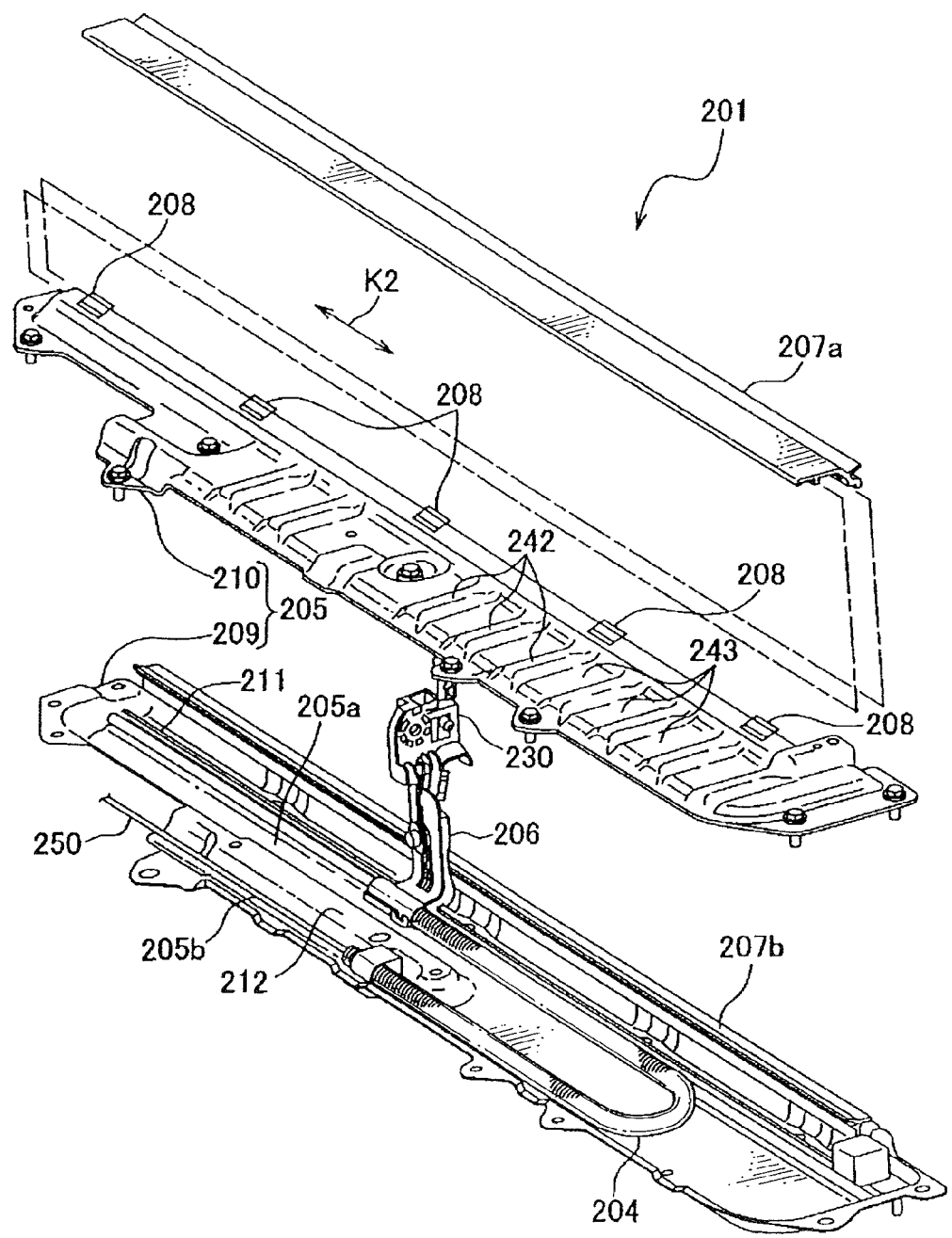
FIG. 8 An exploded view of the conventional electrical wire routing device shown in FIG. 7.

Further, in the present invention, since the movement section 7 and the housing section 8 are provided as separated parts, the stiffness of the movement section 7 and the housing section 8 can be improved, which allows the strength of the case 9 to be improved. The recess or the projection, which would have been provided (see FIGS. 7 and 8) for improving stiffness heretofore, are not required to be provided in the movement section 7 and the housing section 8, which allows the shape thereof to be simplified. Further, since each of the movement section 7 and the housing section 8 is provided as separated parts and formed in the cross-sectional uniform shape along the longitudinal direction, these movement section 7 and the housing section 8 can be formed by extrusion molding or roll molding at low processing cost. The roll molding denotes a fabrication method that by metal plate in the band plate shape being passed through in sequence a plurality of pairs of molding rolls arranged sequentially, the metal plate is deformed along the surface of the molding rolls so that the metal plate is fabricated in the various shape such as cylindrical or columnar shape. Although, in the present embodiment, the movement section 7 and housing section 8 are made of metal, the movement section or the housing section also made of synthetic resin, not limited thereby in the present invention. Namely, the movement section and the housing section in the invention may be made of any materials as far as they can withstand deformation or breakage when stomped by the passenger of the automobile.

The above-mentioned corrugated tube 4 is made of synthetic resin such as polypropylene, formed in the tubenal bellows shape with small-diameter troughs and large-diameter peaks alternately continued along the axial direction, and thus formed bent-deformable, i.e., elastic, deformable. The corrugated tube 4 protects the electric wire 5 by passing through the electric wire 5 therein. The electric wire 5 in the invention may be also single or plural.

The slider 10 is made of synthetic resin, and includes, as shown in FIGS. 4 and 5, a tube attachment portion 30 slidably attached to a space 79 surrounded by the bottom wall 71, the side wall 72, the upper wall 73, and the inner wall 74 of the movement section 7 mentioned above, to which one end 4a of the corrugated tube 4 is attached to, and a slider body 40 guiding the electric wire 5 extracted from one end 4a of the corrugated tube 4, from inside the movement section 7 into the seat 3 via the slit 78. The one end 4a of the corrugated tube 4 is also extracted from the one end 8a of the housing section 8 and drawn from the one end 7a of the movement section 7 into the space 79 of the movement section 7.

Furthermore, the space 79 of the movement section 7 and the slit 78 mentioned above are displaced each other along the width direction of the movement section 7 (the arrow X direction). The displacement of the space 79 and slit 78 each other in the width direction of the movement section 7 in the invention prevents foreign particles penetrating into the movement section 7 through the slit 78 from being clogged in the space 79 and then the slider 10 from not moving smoothly. In case of foreign particles such as a branch penetrating into the movement section 7, this also prevents the foreign particles from contacting the corrugated tube 4 and the tube attachment portion 30, and then the corrugated tube 4 and the tube attachment portion 30 from being damaged.

The tube attachment portion 30 includes a pair of clips 31 and 34 vertically clipping the one end 4a of the corrugated tube 4 and extending along the longitudinal direction of the movement section 7, a hinge coupling the pair of clamps 31 and 34 each other, and a lock means fixing the pair of clamps 31, 34 each other with the corrugated tube 4 clipped between the pair of clamps 31, 34.

The one of the pair of clamps 31 is stacked on the lower side of the one end 4a of the corrugated tube 4. The clamp 31 has a plurality of ribs 32 biting into troughs, i.e., between peaks of the corrugated tube 4.

The other of the pair of clamps 34 is stacked on the upper side of the one end 4a of the corrugated tube 4. The clamp 34 has a plurality of ribs 35 biting into troughs, i.e., between peaks of the corrugated tube 4.

Further, the corrugated tube 4 is clipped between the pair of clips 31, 34 in such a direction that the axial direction is parallel to the longitudinal direction of the movement section 7. Biting of the plurality of ribs 32, 35 into troughs prevents the corrugated tube 4 from deflecting from the pair of clips 31, 34.

The slider body 40 includes a first tube portion 42 tubularly extending from the clip 31 along the width direction of the movement section 7, a tube 41 tubularly formed in a L-shape by a second tube portion 43 tubularly extending upward from an end away from the clip 31 of the first tube portion 42, and a guide section 45 extending in the plate-like shape from the upper end of the second tube portion 43. The second tube portion 43 is passed through the slit 78, and the upside thereof is positioned out the movement section 7 as shown in FIG. 5. By the electric wire 5 extracted from the one end 4a of the corrugated tube 4 and passed through between the pair of clips 31, 34, being passed through the tube 41, the tube 4 guides the electric wire 5 passing from within the movement section 7 through the slit 78 to the seat 3. The tube portion 41 is also provided with a slit 44 straightly cut from the end of the clip 31 side of the first tube portion 42 to the top of the second tube portion 43. The guide section 45 also follows the electric wire 5 extracted from the tube portion 41 as shown in FIG. 4, and guides the electric wire 5 to the seat 3.

Namely, the slider 40 has the electric wire 5 pass through the tube portion 41, and the upside thereof is passed through the slit 78 of the movement section 7 and a cut 15b of the mat (only shown in FIG. 5), projects toward the passenger compartment, and guides the electric wire 5 to the seat 3 positioned in the passenger compartment side.

The slider 10 in the embodiment is fastened to the seat 3 with a string or a wire of metal, synthetic resin, or cloth. The slider 10 thus slides in association with the movement of the seat 3. The length of the string or the wire is also formed shorter than that of the electric wire 5 wired between the slider 10 and the seat 3. Besides above, in the invention, the slider 10 may be fastened to the support body 11 with such a string or a wire as mentioned above. Note that because the slider 10 is fastened to the seat 3 with the electric 5, the slider 10 may not be fastened to the seat 3 or the support body 11 with a string or a wire.

Figure 2:
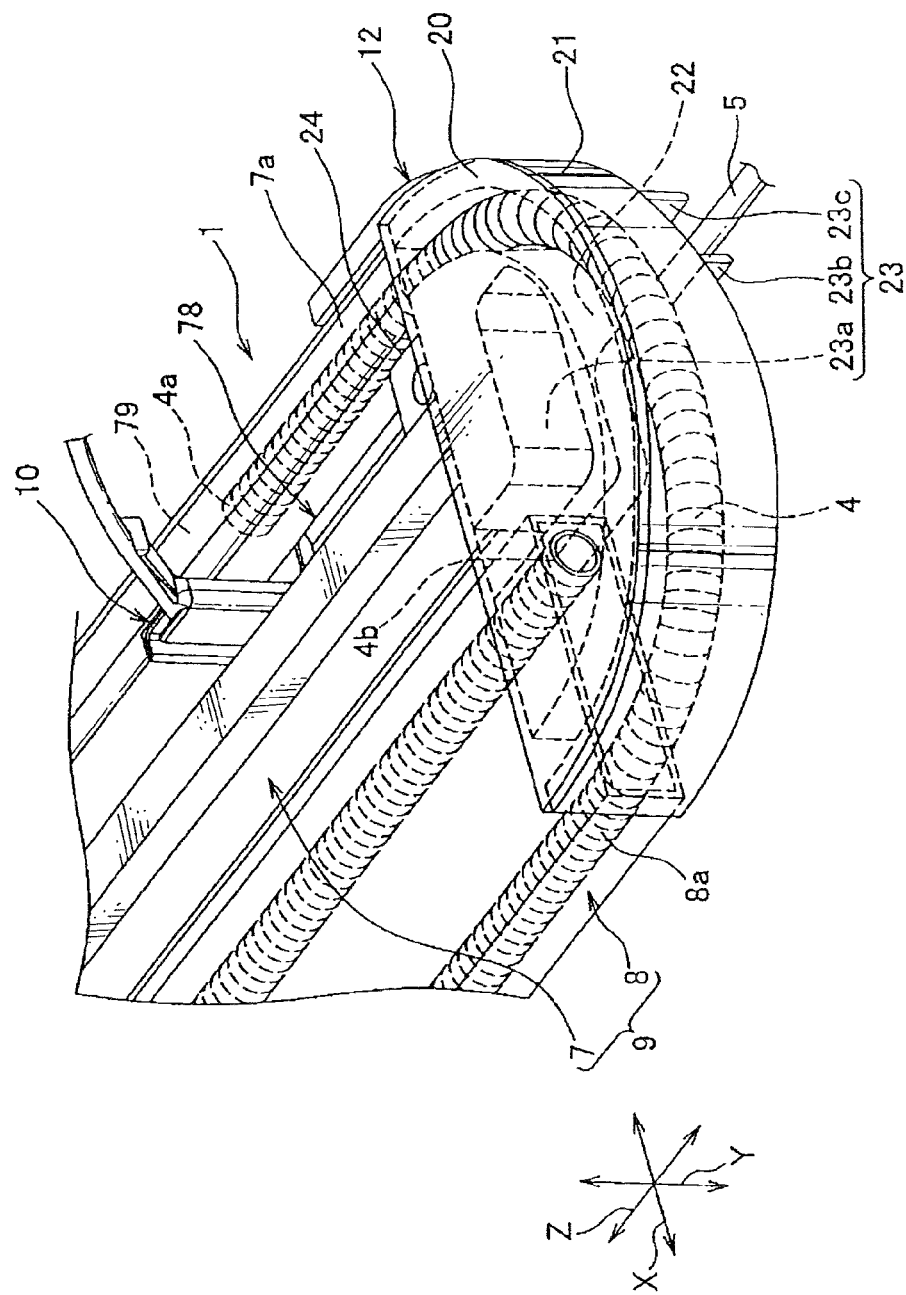
FIG. 2 A main section enlarged view of the electrical wire routing device shown in FIG. 1.
Figure 3:
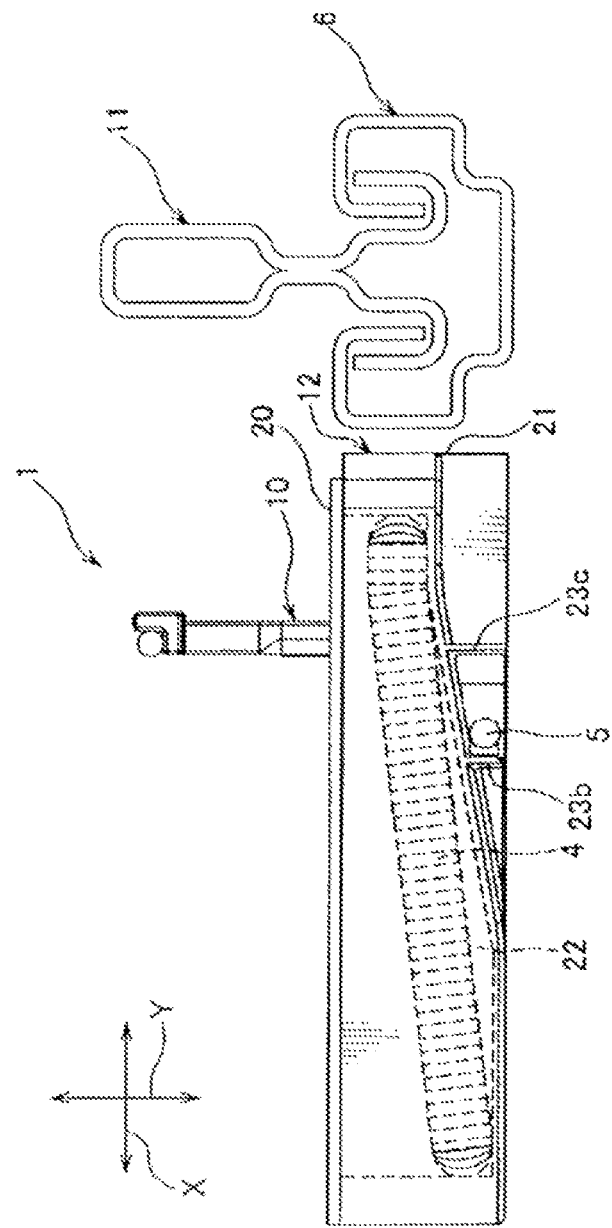
FIG. 3 A side view showing the electrical wire routing device shown in FIG. 1.
Figure 6:
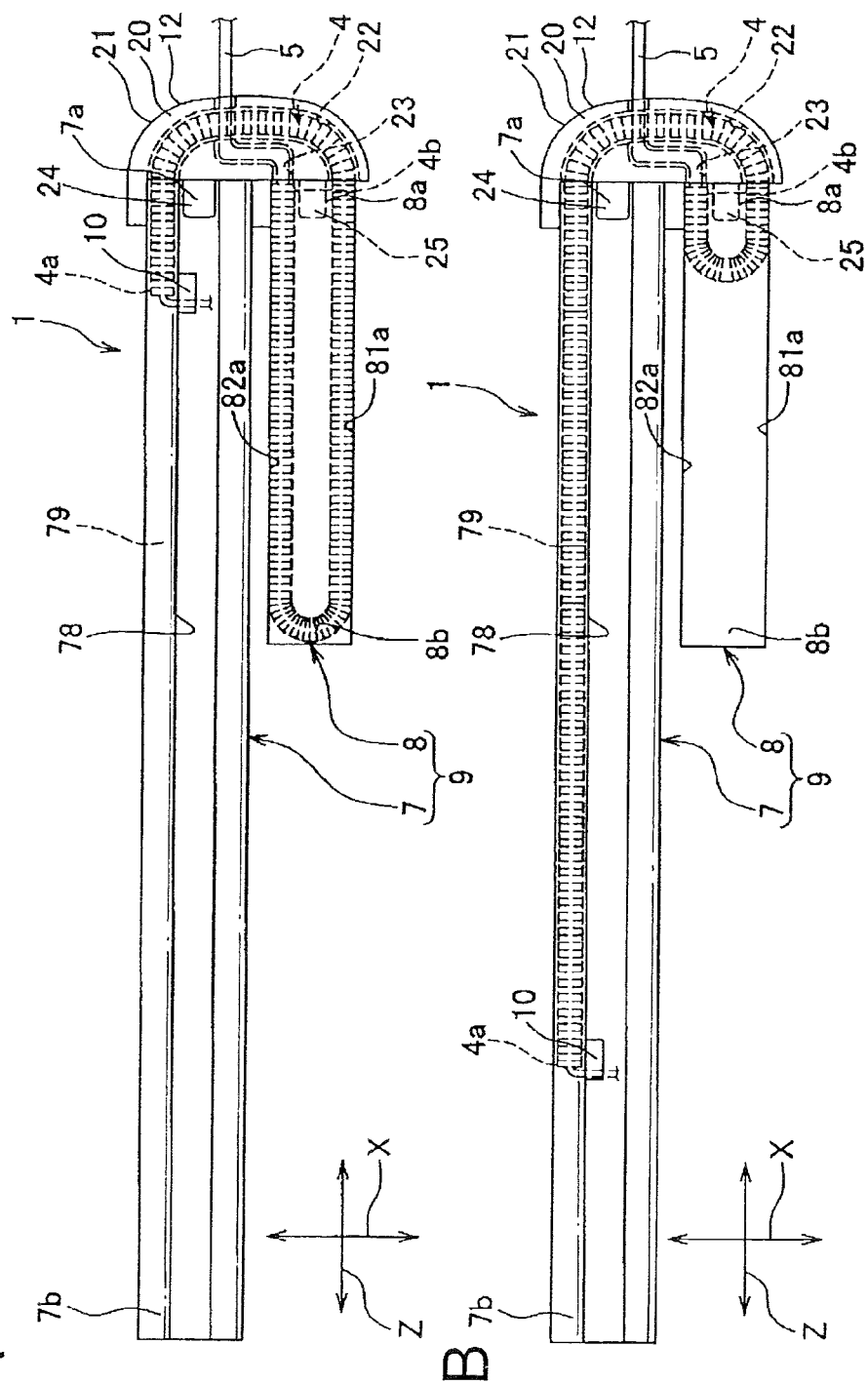

The guide member 12 is made of synthetic resin, and as shown in FIGS. 2 and 6, includes a main body 21 formed in the generally half-columnar shape, a plate portion 20 attached to the upper surface of the main body 21. The main body 21 includes a first fixing portion 24 fixed to the one end 7a of the movement section 7, a second fixing portion 25 attached to the one end 8a of the housing section 8, and a guide section 22 bending the corrugated tube 4 extracted from the one end 7a of the movement section 7 to guide it into the one end 8a of the housing section 8 positioned near the one end 7a of the movement section 7 and guiding the corrugated tube 4 to abut the inner surface 81a of the housing section 8 away from the movement section 7, i.e., the inner surface of the side wall 81.

The guide section 22 is a slit convexly formed from the upper surface of the main body 21, and is formed such that the planer view thereof is semicircular or in a U-shape. The corrugated tube 4 is bent in a U-shape by being accommodated in the guide section 22, and is guided into the housing section 8. The bottom of the guide section 22 is arranged inclined in the direction away from the floor 2 as approaching the movement section 7 from the housing section 8, and a portion of the bottom of the guide section 22 near the movement section 7 is spaced from the floor 2.

The corrugated tube 4 drawn into the one end 8a of the housing section 8 by the guide section 22 is further bent in a U-shape in the housing section 8 and the bent portion thereof abuts the inner surface 82a of the housing section 8 near the movement section 7, i.e., the inner surface of the side wall 82 by the force of restitution of the corrugated tube 4. Namely, the corrugated tube 4 is enlarged in the housing section 4 by force of restitution generated by being bent twice in the same bending direction to push against the inner surface 81a and the inner surface 82a.

Furthermore, the guide member 12 is provide with a derivation section 23 in the main body 21 extracting the electric wire 5 out of the housing section 8, which has been extracted from the other end 4b of the corrugated tube 4 bent again in the housing section 8, in such a way as to cross each other at height vertically different from the guide section 22. The derivation section 23 is composed of a hole 23a communicating with the one end 8a of the housing section 8 and a space positioned under a portion of the bottom of the guide section 22 near the movement section 7, and a pair of stands 23b, 23c standing from a portion of the bottom of the guide section 22 near the movement section 7 toward the floor 2 side. The other end 4b of the corrugated tube 4 bent again in the housing section 8 is positioned at the one end 8a of the housing section 8, and the electric wire 5 extracted from the one end 8a is passed through the hole 23a mentioned above, then through between the pair of stands 23a, 23b, then through under the guide section 22, and extracted out of the housing section 8. Further, the electric wire 5 thus extracted out of the housing section 8 is connected to electric devices such as an ECU (Electronic Control Unit) attached to the car body as mentioned above.

Since the present invention includes: the guide member 12 having the guide section 22 bending the corrugated tube 4 in a U-shape extracted from the movement section 7, guiding the corrugated tube 4 into the housing section 8, and guiding the corrugated tube 4 abutting to the inner surface 81a of the housing section 8 away from the movement section 7; and the corrugated tube 4 bent again in a U-shape in the same bent direction as bent by the guide section 22 in the housing section 8, the corrugated tube 4 is enlarged in the housing section 8 to push against the inner surface 81a, 81b, and therefore the corrugate tube 4 is not rubbed to each other when the corrugated tube 4 come in and out the housing section 8 without providing the regulation portion (see FIG. 8) or a guide member such as a pulley which would conventionally have been provided so that the corrugated tube 4 moves smoothly, which further prevents the corrugated tube 4 positioned outside the case 9 from scarring. Accordingly, the housing section 8 can be simply, tubularly formed and simply configured; and compact electrical wire routing device can be provided. Note that in the present invention "the same bending direction" means a plurality of bending portions bending spiral wholly.

Further, since the corrugated tube 4 extracted from the space 79 of the movement section 7 is guided to abut the inner surface 81a of the housing section 8 away from the movement section 7, the routing root of the corrugated tube 4 is largely turned, i.e., the bending radius becomes large, which allows the corrugate tube 4 to move smoothly and prevents the corrugated tube 4 from having heavy bent habit. Further, bent of the corrugated tube 4 in a U-shape in the housing section 8 in the same bent direction as bent by the guide section 22 prevents the corrugated tube 4 from having heavy bent habit in an S-shape.

Since there is provided the guide member 12 in the present invention having the derivation section 23 extracting the electric wire 5 extracted from the other end 4b of the corrugated tube 4 bent again in the housing section 8 out of the housing section 8 in such a way as to cross to each other at height vertically different from the guide section 22, it prevents the corrugated tube 4 and electric wire 5 from rubbing to each other at the crossed portions when the corrugated tube 4 comes in and out the housing section 8. Alternatively, in the invention, the corrugated tube 4 is further extended from the other end 4b, and the extended portion can be passed through the derivation section 23.

The pair of malls 17a, 17b is attached to outer circumference of the pair of upper walls 73, 76. The pair of malls 17a, 17b covers the slit 78, and therefore prevents foreign particles such as grit and dust from penetrating from the slit 78 into the movement section 7.

Next, operation of the electrical wire routing device configured as mentioned above is described in reference to the FIG. 6. In the electrical wire routing device 1, as shown in FIG. 6(a), the corrugated tube, i.e., the extra length of the electric wire 5 is accommodated in the housing section 8 when the slider 10, i.e., the seat 3 is positioned at the one end 7a of the movement section 7. Then, as shown in FIG. 6(b), as the slider 10, i.e., the seat 3 is sliding from the one end 7a of the movement section 7 to the other end 7b thereof, the corrugated tube 4, i.e., the extra length of the electric wire 5 is been extracted from the one end 8a of the housing section 8 and drawn into the one end 7a of the movement section 7.

In the embodiment mentioned above, though the movement section 7 and the housing section 8 are provided as separated parts, in the present invention, those can alternatively be disposed integrally.

In the embodiment mentioned above, though "a tube" is a corrugated tube, in the present invention, "a tube" can alternatively be a tube having force of restitution which will return straightly when given bending force.

Since the embodiment mentioned above only indicates a typical configuration of the present invention, the invention may not be limited to these embodiments. Therefore, unless otherwise such changes and modifications depart from the scope of the present invention hereafter defied, they should be construed as being included therein.

REFERENCE SIGNS LIST 1 electrical wire routing device
2 floor (car body)
3 seat (slide body)
4 corrugated tube (tube)
5 electric wire
7 movement section
8 housing section
9 case
10 slider
12 guide member
22 guide section
23 derivation section
75, 82 side wall (partition wall)
81a, 82a inner surface

The invention claimed is:
1. An electrical wire routing device for routing an electric wire across between a car body and a seat disposed slidably with respect to the car body, comprising:
   a case including a movement section, to which a slider is slidably attached along a sliding direction of the seat, and a housing section accommodating an extra length of the electric wire,
   wherein the electric wire is attached to the slider and is guided into the seat, wherein the movement section and the housing section are placed in a direction perpendicular to the sliding direction and fixed to the car body, and wherein the case is fixed to the car body and wherein the movement section is provided aside from a support rail for the seat; and
   a partition wall separating the movement section and the housing section and being disposed between the movement section and the housing section along a whole length of the movement and the housing;
   wherein the electric wire is extracted from one end portion of the movement section and drawn into the housing section through one end portion of the housing section, wherein the end portion is positioned near the one end portion of the movement section, and wherein the extra length of the electric wire is accommodated in the housing section while being bent in a U-shape.

2. The electrical wire routing device as claimed in claim 1, further comprising:
- a tube made of elastic and deformable material, the tube accommodating the electric wire; and
- a guide member provided with a guide section, the guide section bending the tube extracted from the one of the movement section in a U-shape so as to guide the tube into the one end of the housing section, and guiding the tube so as to abut an inner side surface of the housing section away from the movement section, wherein the tube is bent in a U-shape in the housing section, and wherein a portion following the U-shape abuts the inner side surface of the housing section near the movement section by force of elastic restitution of the tube.

3. The electrical wire routing device as claimed in claim 2, further comprising a derivation section disposed in the guide member, the derivation section crossing the electric wire, which is extracted from the tube bent in the housing section, at a vertically different height from a height of the guide section for extracting the electric wire out of the housing section.

4. The electrical wire routing device as claimed in claim 1, wherein the movement section and the housing section are provided as separated parts, and wherein each of the movement section and housing section includes a side wall as the partition wall.

5. The electrical wire routing device as claimed in claim 4, wherein each of the movement section and the housing section is formed in a uniform cross-sectional shape along the sliding direction.

6. The electrical wire routing device as claimed in claim 2, wherein the movement section and the housing section are provided as separated parts, and wherein each of the movement section and housing section includes a side wall as the partition wall.

7. The electrical wire routing device as claimed in claim 3, wherein the movement section and the housing section are provided as separated parts, and wherein each of the movement section and housing section includes a side wall as the partition wall.

8. The electrical wire routing device as claimed in claim 6, wherein each of the movement section and the housing section is formed in a uniform cross-sectional shape along the sliding direction.

9. The electrical wire routing device as claimed in claim 7, wherein each of the movement section and the housing section is formed in a uniform cross-sectional shape along the sliding direction.

* * * * *